United States Patent
Clark et al.

(10) Patent No.: US 7,735,223 B2
(45) Date of Patent: Jun. 15, 2010

(54) METHOD OF FABRICATING OR REPAIRING A BLISK

(75) Inventors: Daniel Clark, Derby (GB); Jeffrey Allen, Derby (GB)

(73) Assignee: Rolls-Royce plc, London (GB)

( * ) Notice: Subject to any disclaimer, the term of this patent is extended or adjusted under 35 U.S.C. 154(b) by 835 days.

(21) Appl. No.: 10/983,249

(22) Filed: Nov. 8, 2004

(65) Prior Publication Data

US 2005/0118330 A1    Jun. 2, 2005

(30) Foreign Application Priority Data

Nov. 27, 2003    (GB) ................. 0327552.6

(51) Int. Cl.
*B23P 6/00*    (2006.01)
(52) U.S. Cl. .......... 29/889.21; 29/889.1; 228/112.1; 228/212; 228/265; 427/140; 427/142; 427/405; 427/456
(58) Field of Classification Search ........... 29/889.21, 29/889.1; 228/112.1, 119, 177, 212, 265; 427/142, 140, 405, 456
See application file for complete search history.

(56) References Cited

U.S. PATENT DOCUMENTS 5,551,623 A * 9/1996 Collot et al. ............ 228/112.1
5,915,743 A * 6/1999 Palma .................... 29/402.18
6,258,402 B1 * 7/2001 Hussary et al. ............ 427/142

FOREIGN PATENT DOCUMENTS

GB    882317 P    11/1961
JP    57058984 A    4/1982

* cited by examiner

*Primary Examiner*—Rick K Chang
(74) *Attorney, Agent, or Firm*—Jeffrey S. Melcher; Manelli Denison & Selter PLLC

(57) ABSTRACT

A method of fabricating or repairing a blisk (10) that comprises a plurality of blades (14) attached to the outer periphery of a disc (12). Blades (14) are formed separately from the disc (12) and are attached to stubs (13) on the disc (12) by friction welding. A metal powder, such as titanium, is sprayed onto the stubs (13) to reinforce them during the friction welding process. Once the stub (13) has been coated with the powder spray, plates (20) are fastened on the disc (12) between which the sprayed coating (18) is clamped. The plates (20) restrain the sprayed coating (18) to prevent delamination during friction welding. Once each of the blades (14) has been welded onto the respective stubs (13) the clamping plates (20) are removed and the sprayed coating (18) is machined away.

12 Claims, 2 Drawing Sheets

METHOD OF FABRICATING OR REPAIRING A BLISK

FIELD OF INVENTION

The present invention relates to a method of fabricating or repairing an assembly for use in gas turbine engines. The method is particularly suitable for fabricating or repairing rotor assemblies in which the blades are formed separately and are joined to the rotor.

BACKGROUND OF THE INVENTION

Integrally bladed rotor assemblies are used in the compressor and turbine sections of a gas turbine engine. These assemblies can be fabricated or repaired by joining separately formed blades to a disc or ring.

Friction welding is one of the techniques that can be used to join the blades to the disc or ring. In friction welding either one or both of the blade and disc are moved relative to one another whilst being urged together with sufficient force to generate frictional heating. A multiplicity of blades are joined to the disc in this way.

The blades are friction welded to stubs of material upstanding from the periphery of the disc. The geometry of the stubs is however such that it has insufficient stiffness for the welding process.

SUMMARY OF THE INVENTION

The present invention seeks to provide a stub that has sufficient rigidity to withstand the local pressure oscillations and the frictional heating.

According to one aspect of the present invention a method of fabricating an assembly comprises the steps of manufacturing a first and a second component, spraying additional material onto part of the first component which is to be joined to the second component, the sprayed material acting to reinforce the part of the first component to be joined to the second component, applying a restraint to the sprayed material to prevent movement thereof, attaching the second component to the part of the first component that has been sprayed and subsequently removing the restraint and the sprayed material.

According to a further aspect of the present invention a method of repairing an assembly comprises the steps of removing a damaged component from the assembly, spraying a material onto the part of the assembly from which the damaged component was removed, applying a restraint to the sprayed material, attaching a new component to the sprayed part of the assembly and removing the restraint and the sprayed material.

The sprayed material is a metal powder, preferably titanium powder having a particle size of the order of 1-100 μm.

In the preferred embodiments of the present invention the material is sprayed at low temperatures in the range of 0-700° C. preferably using either a cold gas dynamic spray method or a high velocity combustion flame spray process.

Plates clamped to the disc act as the restraint to prevent movement and delamination of the sprayed material during friction welding.

BRIEF DESCRIPTION OF THE DRAWINGS

The present invention will now be described with reference to the accompanying drawings in which.

DETAILED DESCRIPTION OF THE INVENTION

Figure 1:
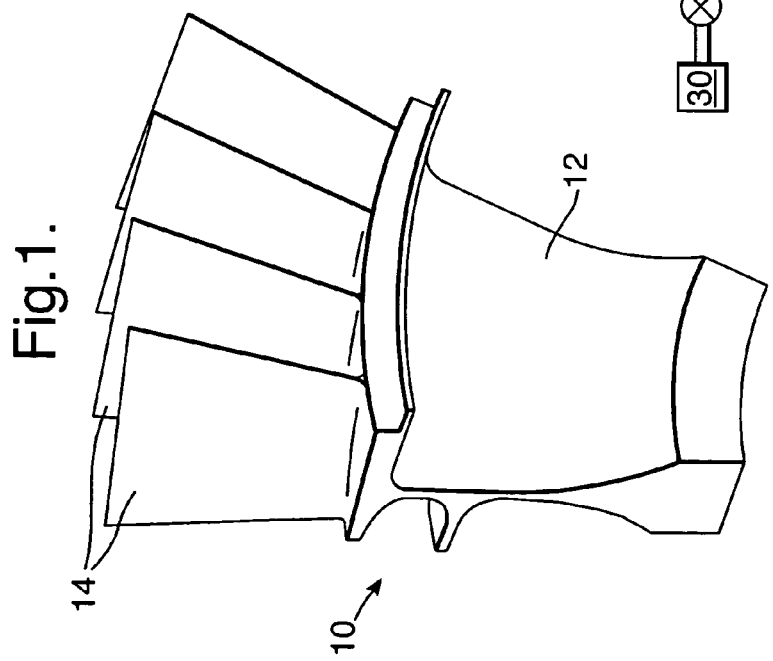
FIG. 1 is a part view of a bladed rotor assembly.

A blisk 10 suitable for use in the compressor or turbine section of a gas turbine engine is shown in FIG. 1. The blisk 10 comprises a plurality of blades 14 attached to the outer periphery of a disc 12 so that they extend radially outward therefrom.

Figure 2:
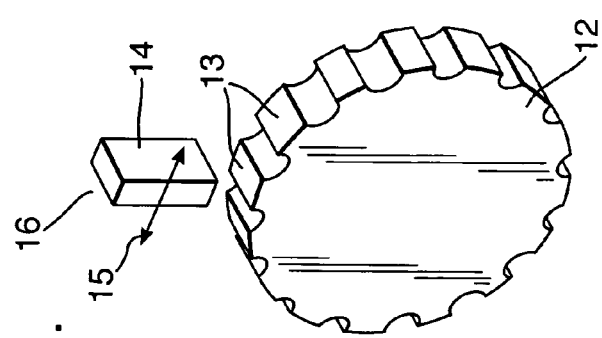
FIG. 2 illustrates friction welding of a blade to form a rotor assembly as shown in FIG. 1.

The blades 14 are formed separately from the disc 12 and are attached thereto by friction welding. During the friction welding process the blades 14 are oscillated relative to the disc 12 as shown in FIG. 2. Each blade 14 is oscillated tangentially, shown by arrow 15, against a stub 13 on the outer periphery of the disc 12 whilst a radial load 16 is applied. The heat generated by the oscillation 15 together with the load 16 results in a weld between the stub 13 and the blade 14. The blisc 10 is then machined to remove any material extruded during the welding process and to give the stub 13 and the blade 12 their final form.

Difficulties have been encountered when friction welding the blades 14 onto the disc 12. The geometry of the stubs 13 is such that it is not stiff enough to withstand the local pressure oscillations and the frictional heating. To overcome these problems a metal coating 18 is sprayed around the stub 13 to reinforce it during the friction welding process, FIG. 5.

Figure 3:
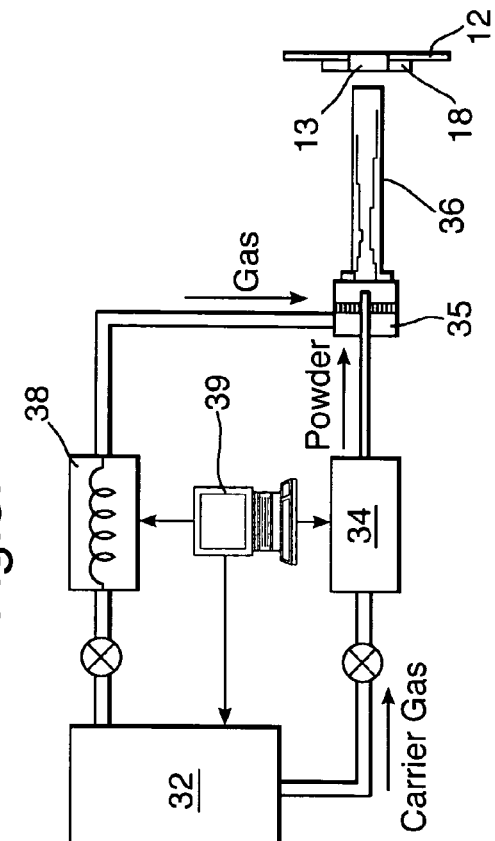
FIG. 3 is a schematic view of apparatus suitable for cold gas dynamic spraying in accordance with one embodiment of the present invention.

In one embodiment of the present invention a metal coating 18 is sprayed onto the stub 13 using a process known as cold gas dynamic spraying, FIG. 3. In this process compressed gas is provided from a high-pressure gas supply 30 to a gas control module 32. The gas is helium however argon, nitrogen or a mixture of these gases can be used. The gas used is pressurised to 100-500 psi.

The gas control module 32 splits that compressed gas flow in two. A small proportion of the compressed gas passes to a powder hopper 34, which contains a metal powder. The metal powder used will depend on the particular application however in the preferred embodiment of this invention titanium powder is used having a having a particle size of the order of 1-50 μm. The gas picks up the powder from the hopper 34 and passes it into a prechamber 35 of a supersonic nozzle 36. The powder feed rate is of the order of 500-1000 g/hour.

The remaining gas flow passes through a tubular resistively heated coil 38. The gas is heated to a temperature of the order of 500° C. by the coil 38. It then passes to the prechamber 35 where it mixes with the carrier gas containing the titanium powder. The expanding gas and the particle stream emanate from the nozzle 36 at a velocity between 300-1200 m/s.

The titanium powder is deposited as a coating 18 around the stub 13 on the disc 12. The nozzle 36 is maintained at a spray distance of the order of 12-50 mm and the coating 18 is built up on both sides of the stub 13 to reinforce it.

A computer 39 controls the cold gas dynamic spray process shown in FIG. 3. The computer 39 is programmed to control the gas control module 32, the powder hopper 34, the gas heater module 38, nozzle 36 and any data logging.

The cold gas dynamic spray process offers the advantage that the coating 18 retains the properties of the initial titanium particles. The coating 18 is deposited at low temperatures between 0-700° C. so has low residual stress and it does not heat the stub 13 or the disc 12 onto which it is deposited.

Figure 4:
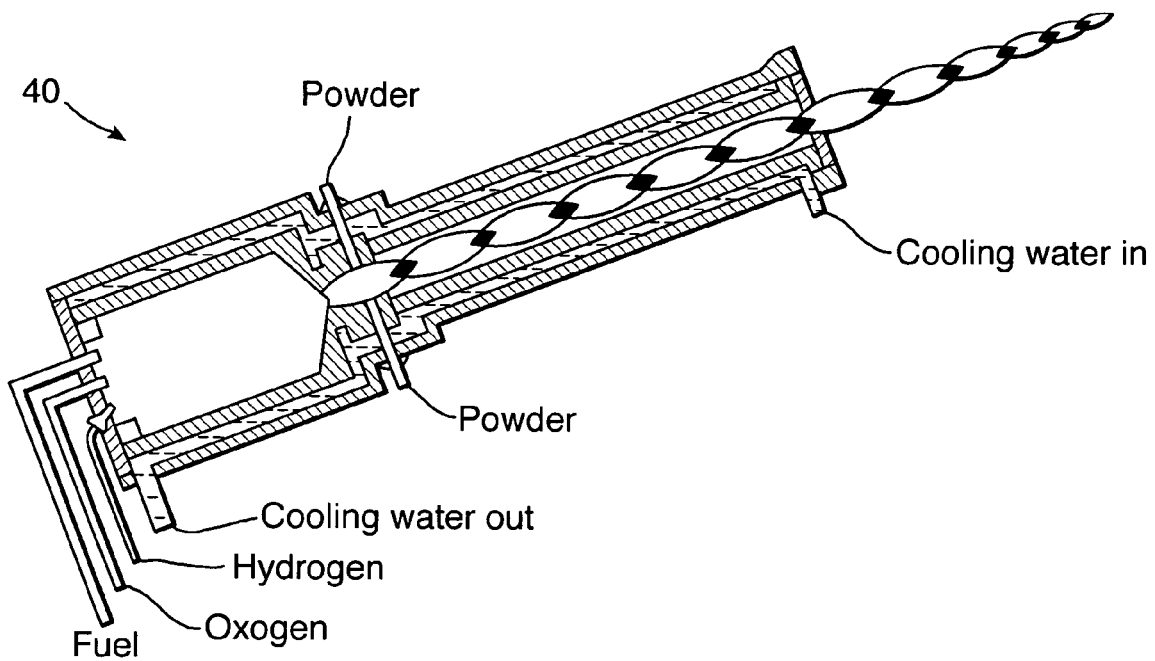
FIG. 4 is a sectional view of a nozzle used for high velocity combustion flame deposition in accordance with a second embodiment of the present invention.

Alternatively titanium powder having a particle size of the order of 10-100 μm can be sprayed onto the stub 13 using a high velocity combustion flame spraying process. A nozzle 40 used in this process is shown in FIG. 4.

Oxygen, hydrogen and a fuel are delivered to the nozzle 40 and are mixed with the titanium powder. The nozzle 40 is cooled by a water jacket and has a converging/diverging portion that accelerates the titanium powder to a velocity of the order of 350 m/s. The nozzle 40 sprays the powder around the stub 13. The nozzle 40 is maintained at a spray distance of the order of 400 mm and is angled at 45°-90° to the surface. The coating 18 is deposited at a temperature of 200° C. and at a rate of 500-1000 g/hr.

Figure 5:
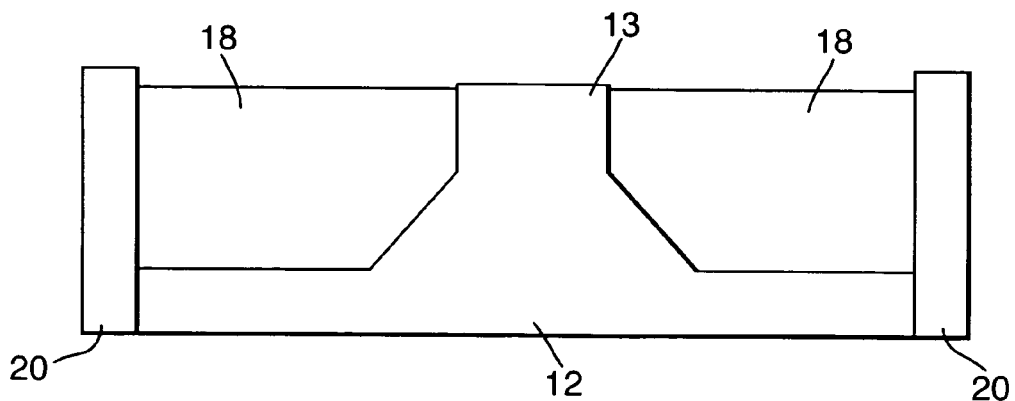
FIG. 5 illustrates a compressive load being applied to metal sprayed onto a stub on a disc.

Once the stub 13 has been coated with the powder spray, either using the cold dynamic gas spray process or a high velocity combustion flame nozzle 40, it is restrained to prevent movement thereof. Plates 20 clamped onto the faces of the disc 12 restrain the coating 18, as shown in FIG. 5, and prevent delamination of the coating 18 during the friction welding process.

The blades 14 are then welded onto the disc stubs 13 using conventional friction-welding techniques. The blades 14 are oscillated relative to the disc 12 whilst applying a radial force 16. Once each of the blades 14 have been welded onto the respective stubs 13 the clamping plates 20 are removed and the sprayed coating 18 is machined away.

Whilst the method described relates to the fabrication of a new bladed rotor it will be appreciated that it can also be used to repair a bladed rotor having damaged blades. Any damaged blades are removed leaving a stub to which the sprayed metal coating is applied. The sprayed coating is then restrained whilst a new blade is friction welded onto the stub.

We claim:

1. A method of fabricating an assembly comprising the steps of:
    manufacturing a first and a second component;
    spraying additional material around a part of the first component which is to be joined to the second component, the part having insufficient stiffness for friction welding, the sprayed material acting to reinforce the part of the first component to be joined to the second component, applying a restraint to the sprayed material to prevent movement thereof;
    friction welding the first component to the second component by moving at least one of the second component and said part against and relative to each other with sufficient force to generate frictional heating and form a weld between the second component and said part attaching the second component to part of the first component that has been sprayed; and
    subsequently removing the restraint and the sprayed material from the part.

2. A method of repairing an assembly comprising the steps of:
    removing a damaged component from the assembly to provide a part of the assembly from which the damaged component was removed, the part having insufficient stiffness for friction welding;
    spraying a material around said part;
    friction welding a new component to said part by moving at least one of a new component and said part against and relative to each other with sufficient force to generate frictional heating and form a weld between the new component and said part, the sprayed material acting to reinforce said part of the assembly from which the damaged component was removed;
    applying a restraint to the sprayed material wherein the restraint acts to substantially prevent movement and delamination of said sprayed material at least during the friction welding and maintains the sprayed material in contact with the part of the assembly that has been sprayed; and
    removing the restraint and the sprayed material from the part.

3. A method as claimed in claim 2 in which the material is sprayed at low temperatures.

4. A method as claimed in claim 3 in which the temperature is in the range of 0-700° C.

5. A method as claimed in claim 2 in which the material to be sprayed is a metal powder.

6. A method as claimed in claim 5 in which the metal powder is titanium.

7. A method as claimed in claim 6 in which the titanium powder has a particle size of the order of 1-100 μm.

8. A method as claimed in claim 2 in which the material is sprayed using a cold gas dynamic spray process.

9. A method as claimed in claim 2 in which the material is sprayed using a high velocity combustion flame spray process.

10. A method as claimed in claim 2 in which the restraint comprises plates between which the sprayed material is clamped.

11. A method as claimed in claim 2 in which the assembly is a bladed rotor.

12. A method of repairing a rotor assembly of a gas turbine engine, the rotor assembly comprising fan blades connected to a disc, the method comprising the steps of:
    removing a damaged fan blade from the rotor assembly to leave a stub on the disc, the stub having insufficient stiffness for friction welding;
    spraying a material around the stub to support the stub;
    applying a restraint to the sprayed material comprising clamping plates to faces of the disc;
    friction welding a new fan blade to the stub by moving at least one the new fan blade and the stub against and relative to each other with sufficient force to generate frictional heating and form a weld between the new fan blade and the stub, the sprayed material acting to reinforce the stub during friction welding, wherein the restraint acts to substantially prevent movement and delamination of the sprayed material at least during the friction welding and maintains the sprayed material in contact with the stub; and
    removing the restraint and the sprayed material from the stub to provide a repaired rotor assembly.

* * * * *